United States Patent
Watanabe et al.

(10) Patent No.: US 7,072,554 B2
(45) Date of Patent: Jul. 4, 2006

(54) OPTICAL FIBER AND OPTICAL FIBER CABLE USING THE SAME

(75) Inventors: Hirohito Watanabe, Yotsukaido (JP); Keiko Mitsuhashi, Sakura (JP); Tsuyoshi Shimomichi, Sanbu-gun (JP); Keiji Ohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/614,033

(22) Filed: Jul. 8, 2003

(65) Prior Publication Data
US 2004/0028366 A1     Feb. 12, 2004

(30) Foreign Application Priority Data

| Aug. 9, 2002 | (JP) | 2002-233812 |
| Aug. 9, 2002 | (JP) | 2002-233813 |
| Aug. 9, 2002 | (JP) | 2002-233814 |
| Aug. 9, 2002 | (JP) | 2002-233815 |

(51) Int. Cl.
   *G02B 6/22* (2006.01)
(52) U.S. Cl. ..................... 385/128; 385/100
(58) Field of Classification Search .......... 385/123–128
   See application file for complete search history.

(56) References Cited

U.S. PATENT DOCUMENTS

| 4,629,285 A | * | 12/1986 | Carter et al. .............. 385/128 |
| 5,119,464 A | * | 6/1992 | Freychet et al. ............ 385/147 |
| 5,379,363 A | * | 1/1995 | Bonicel et al. ............. 385/114 |
| 5,416,875 A | * | 5/1995 | Keplinger et al. .......... 385/102 |
| 5,485,539 A | * | 1/1996 | Mills ....................... 385/114 |
| 5,796,905 A | * | 8/1998 | Hoffart et al. ............. 385/128 |
| 5,945,632 A | * | 8/1999 | Butera ....................... 174/36 |
| 6,026,207 A | * | 2/2000 | Reddy et al. ............... 385/128 |
| 6,278,828 B1 | * | 8/2001 | Stocklein et al. .......... 385/123 |

(Continued)

FOREIGN PATENT DOCUMENTS

JP     11-513130     11/1999

*Primary Examiner*—Juliana Kang
(74) *Attorney, Agent, or Firm*—Oblon, Spivak, McClelland, Maier & Neustadt, P.C.

(57) ABSTRACT

A distinctive optical fiber comprises an optical fiber core, distinctive layers, and a colored layer. A plurality of the distinctive layers including fine drops of ink having a specific particle size is disposed intermittently on the optical fiber core in the longitudinal direction of the optical fiber core. The colored layer is disposed on the distinctive layers and on the optical fiber core on which the distinctive layers are not disposed. The following five requirements are required for obtaining the distinctive optical fiber excellent in distinctiveness and with low transmission loss. The thickness of the colored layer is chosen so as to be larger than or equal to 2 μm and smaller than or equal to 10 μm. The thickness of the distinctive layers is chosen so as to be larger than or equal to 0.5 μm and smaller than or equal to 2.5 μm. The length of the distinctive layers is chosen so as to be larger than or equal to 1 mm and smaller than or equal to 15 mm. The interval of the distinctive layers is chosen so as to be in the range between 1 mm and 200 mm. The occupied ratio of the distinctive layers is chosen so as to be less than or equal to 20%. The major diameter of the fine drops of ink is chosen so as to be larger than or equal to 100 μm and smaller than or equal to 400 μm.

6 Claims, 11 Drawing Sheets

U.S. PATENT DOCUMENTS

| | | |
|---|---|---|
| 6,292,613 B1 * | 9/2001 | Fort .......................... 385/128 |
| 6,317,553 B1 * | 11/2001 | Harper et al. ............... 385/128 |
| 6,532,329 B1 * | 3/2003 | Thompson .................. 385/114 |
| 6,731,844 B1 * | 5/2004 | Conrad et al. .............. 385/114 |
| 2003/0044136 A1 * | 3/2003 | Nakamura et al. .......... 385/102 |
| 2003/0108311 A1 * | 6/2003 | Ma ............................ 385/123 |
| 2003/0169179 A1 * | 9/2003 | James, II ................. 340/854.9 |

\* cited by examiner

FIG.3

| | THICKNESS OF DISTINCTIVE LAYER (μm) | THICKNESS OF COLORED LAYER (μm) | VARIATIONS IN TRANSMISSION LOSS (dB/km) | DISTINCTIVENESS |
|---|---|---|---|---|
| TEST 1 | 0.4 | 5 | 0.00 | × |
| TEST 2 | 0.5 | 5 | 0.00 | ○ |
| TEST 3 | 2.5 | 5 | 0.00 | ○ |
| TEST 4 | 2.6 | 5 | 0.05 | ○ |
| TEST 5 | 0.5 | 5 | 0.00 | ○ |
| TEST 6 | 0.5 | 10 | 0.00 | ○ |
| TEST 7 | 0.5 | 11 | 0.00 | × |

FIG.5

| | LENGTH OF DISTINCTIVE LAYER (mm) | THICKNESS OF COLORED LAYER (μm) | VARIATIONS IN TRANSMISSION LOSS (dB/km) | DISTINCTIVENESS |
|---|---|---|---|---|
| TEST 1 | 0.8 | 5 | 0.00 | × |
| TEST 2 | 1 | 5 | 0.00 | ○ |
| TEST 3 | 10 | 5 | 0.01 | ○ |
| TEST 4 | 15 | 5 | 0.02 | ○ |
| TEST 5 | 20 | 5 | 0.04 | ○ |
| TEST 6 | 1 | 10 | 0.00 | ○ |
| TEST 7 | 10 | 10 | 0.00 | ○ |
| TEST 8 | 1 | 11 | 0.02 | × |
| TEST 9 | 10 | 11 | 0.02 | × |

FIG.7

| | LENGTH OF DISTINCTIVE LAYER (mm) | MINIMUM INTERVAL OF DISTINCTIVE LAYER (mm) | MAXIMUM INTERVAL OF DISTINCTIVE LAYER (mm) | INTERVAL OF DISTINCTIVE LAYER (mm) | DISTINCTIVENESS |
|---|---|---|---|---|---|
| TEST 1 | 2 | 0.5 | 50 | — | × |
| TEST 2 | 2 | 1 | 50 | — | ○ |
| TEST 3 | 2 | 2 | 50 | — | ○ |
| TEST 4 | 2 | 2 | 100 | — | ○ |
| TEST 5 | 2 | 2 | 200 | — | ○ |
| TEST 6 | 2 | 2 | 300 | — | × |
| TEST 7 | 4 | — | — | 0.5 | × |
| TEST 8 | 4 | — | — | 1 | ○ |
| TEST 9 | 4 | — | — | 2 | ○ |
| TEST 10 | 4 | — | — | 10 | ○ |
| TEST 11 | 4 | — | — | 100 | ○ |
| TEST 12 | 4 | — | — | 200 | ○ |
| TEST 13 | 4 | — | — | 300 | × |

FIG.9

| | LENGTH OF DISTINCTIVE LAYER (mm) | LENGTH OF NON-DISTINCTIVE LAYER (mm) | DEGREE OF OCCUPANCY OF DISTINCTIVE LAYER (%) | VARIATIONS IN TRANSMISSION LOSS (dB/km) | DISTINCTIVENESS |
|---|---|---|---|---|---|
| TEST 1 | 2 | 48 | 4 | 0.00 | ○ |
| TEST 2 | 5 | 45 | 10 | 0.01 | ○ |
| TEST 3 | 10 | 40 | 20 | 0.02 | ○ |
| TEST 4 | 15 | 35 | 30 | 0.28 | ○ |
| TEST 5 | 4 | 96 | 4 | 0.00 | ○ |
| TEST 6 | 10 | 90 | 10 | 0.01 | ○ |
| TEST 7 | 20 | 80 | 20 | 0.02 | ○ |
| TEST 8 | 30 | 70 | 30 | 0.3 | ○ |

FIG.11

| | MAJOR DIAMETER OF FINE DROP OF INK (μm) | DISTINCTIVENESS | MANUFACTURED LENGTH OF OPTICAL FIBER*) |
|---|---|---|---|
| TEST 1 | 80 | × | 100 |
| TEST 2 | 100 | ○ | 100 |
| TEST 3 | 200 | ○ | 100 |
| TEST 4 | 250 | ○ | 95 |
| TEST 5 | 400 | ○ | 80 |
| TEST 6 | 500 | ○ | 65 |
| TEST 7 | 600 | ○ | 50 |

*) SHOWING RELATIVE VALUES WHERE THE VALUE OF TEST 2 IS SET AT 100

OPTICAL FIBER AND OPTICAL FIBER CABLE USING THE SAME

CROSS REFERENCE TO RELATED APPLICATION

This application claims benefit of priority under 35 U.S.C. § 119 to Japanese Patent Application No. 2002-233812 filed on Aug. 9, 2002, Japanese Patent Application No. 2002-233813 filed on Aug. 9, 2002, Japanese Patent Application No. 2002-233814 filed on Aug. 9, 2002, and Japanese Patent Application No. 2002-233815 filed on Aug. 9, 2002, the entire contents of which are incorporated by reference herein.

BACKGROUND OF THE INVENTION

1. Field of the Invention

The present invention relates to an optical fiber having distinctive layers composed of ink by which the optical fiber can be distinguished from the others, and to an optical fiber cable using the same.

2. Description of the Related Art

As transmission capacity increases in the field of optical communication, utilization of an optical fiber cable including many optical fibers therein is rapidly progressing. Accompanying this progress, it has been a requirement that the optical fiber itself has a multi-distinctive function, such that a workman can distinguish instantaneously each optical fiber composing an optical fiber cable. The following two methods for the above requirement have been conventionally employed. The first is a method where an optical fiber is distinguished from the others through coloring a coating resin itself such as polyamide resin, which covers an optical fiber core. The second is a method where an optical fiber is distinguished from the others through spraying ultraviolet-rays hardenable ink or thermosetting ink on the optical fiber core to form a colored layer. However, since the number of colors should be limited in the case where a distinction is made by coloring, these methods cannot cope with a sharp increase in the number of optical fibers composing the optical fiber cable.

Thereby, providing a new distinctive function for an optical fiber through forming further distinctive layers by spraying ink or the like intermittently in the longitudinal direction of the optical fiber on a colored layer, has been considered. However, in the case where a distinction is made by a distribution pattern of distinctive layers on the colored layer, the distinctive layers composed of ink or the like, are liable to be peeled off by being touched by something at this portion, and the distinctive layers composed of ink are also liable to be dissolved by coming into contact with chemicals, etc., resulting in the problem where the distinctive function of the optical fiber is neutralized by external factors.

Therefore, forming distinctive layers composed of ink or the like between an optical fiber core and a colored layer in order to obtain an optical fiber whose distinctive function is not neutralized by any external factors, has also been considered. Nevertheless, even in the optical fiber with such a structure, it has been pointed out that there is still a problem in that transmission loss of the optical fiber may be increased by the distinctive layers formed between the optical fiber core and the colored layer.

SUMMARY OF THE INVENTION

Thereby, the present invention has been proposed in consideration of the actual situation described above and aims to provide a distinctive optical fiber including clear distinctive layers which are not neutralized or peeled off with ease by external factors, wherein there is no increase in transmission loss of the optical fiber, and which includes a multi-distinctive function. Further, the present invention aims to provide, using this distinctive optical fiber, an optical fiber cable in which misconnections or the like of any optical fibers are not generated at the terminals of the cable.

In order to achieve the above object, the present invention provides a distinctive optical fiber comprising an optical fiber core, a colored layer coated over the optical fiber core, and a plurality of distinctive layers, which are composed of ink, disposed intermittently in the longitudinal direction of the optical fiber core in between the optical fiber core and the colored layer.

According to the present invention, since distinctive layers having a multi-distinctive function such as a distribution pattern are disposed in between an optical fiber core and a colored layer, and thus, the distinctive layers are not neutralized or peeled off with ease by external factors, and the distinctive layers include a multi-distinctive function.

In a preferred embodiment of the present invention, the thickness of the distinctive layers is larger than or equal to 0.5 μm and smaller than or equal to 2.5 μm, and the thickness of the colored layer is larger than or equal to 2 μm and smaller than or equal to 10 μm.

According to this embodiment, since a range of the thickness of the distinctive layers is chosen so as to be larger than or equal to 0.5 μm and smaller than or equal to 2.5 μm, and a range of the thickness of the colored layer is chosen so as to be larger than or equal to 2 μm and smaller than or equal to 10 μm, the distinctive layers and the colored layer have appropriate thicknesses resulting in clean distinctive layers which are composed of ink. Further, when a plurality of the distinctive layers is disposed at a prescribed interval in the longitudinal direction of an optical fiber, a distribution pattern of ink becomes easier to be divided from the others to enhance distinctiveness of a distinctive optical fiber. Moreover, since the distinctive layers never become too thick, protrusions cannot be generated in the colored layer disposed on the distinctive layers. Thereby, even though an external force such as bending is applied to the optical fiber, delaminations cannot be generated between the distinctive layers and the colored layer, or between the distinctive layers and an optical fiber core. Further, even if non-uniform force is applied to the optical fiber core, an increase in transmission loss cannot be induced.

In another preferred embodiment of the present invention, the length of the distinctive layers is larger than or equal to 1 mm and smaller than or equal to 15 mm.

According to this embodiment, since a range of the length of the distinctive layers is chosen so as to be larger than or equal to 1 mm and smaller than or equal to 15 mm, the distinctive layers have an appropriate length, resulting in the enhancement of the distinctiveness of a distinctive optical fiber. Generally, since non-uniform force is applied to the distinctive optical fiber along its circumference at the portion where the distinctive layers are coated on an optical fiber core, the optical fiber is slightly bent in this area. Although this non-uniform force has little effect on transmission loss in only one distinctive layer, the effect on the transmission loss will become noticeable in the case where a lot of distinctive layers exist in the longitudinal direction of the distinctive optical fiber. Particularly, the effect will be larger for an optical fiber core whose bending-loss is large. However, since each distinctive layer is spaced apart from one another, confining its length to larger than or equal to 1 mm and smaller than or equal to 15 mm, the effect on the transmission loss can be reduced.

In another preferred embodiment of the present invention, the interval of the distinctive layers is larger than or equal to 1 mm and smaller than or equal to 200 mm.

According to this embodiment, since a range of the interval of the distinctive layers is chosen so as to be larger than or equal to 1 mm and smaller than or equal to 200 mm, the interval of the distinctive layers can be freely selected resulting in the enhancement of the distinctiveness of a distinctive optical fiber. That is to say, by freely selecting the interval of the distinctive layers from the range larger than or equal to 1 mm and smaller than or equal to 200 mm, a number of distribution patterns of the distinctive layers can be generated without degrading the distinctiveness of the distinctive optical fiber.

In another preferred embodiment of the present invention, the occupied ratio of the total length of the distinctive layers to the length of the optical fiber core is less than or equal to 20%.

According to this embodiment, since the occupied ratio of the total length of the distinctive layers to the length of the distinctive optical fiber is chosen so as to be less than or equal to 20%, bending-loss of the optical fiber core can be reduced. Generally, since non-uniform force is applied to the optical fiber core along its circumference at the portion where the distinctive layers are formed on an optical fiber core, the optical fiber core is slightly bent in this area. Although this non-uniform force is of little effect on transmission loss in only one distinctive layer, the effect on the transmission loss will become noticeable in the case where a lot of distinctive layers exist in the longitudinal direction of the distinctive optical fiber. Particularly, the effect will be larger for an optical fiber core whose bending-loss is large. Therefore, by making the occupied ratio of the total length of the distinctive layers to the length of the optical fiber core less than 20%, the effect on the transmission loss can be reduced.

In another preferred embodiment of the present invention, the distinctive layers are formed from the fine drop of ink having a major diameter larger than or equal to 100 μm and smaller than or equal to 400 μm.

According to this embodiment, since the distinctive layers are formed out of the fine drop of ink having a major diameter larger than or equal to 100 μm and smaller than or equal to 400 μm, ink can sufficiently adhere to an optical fiber core resulting in the enhancement of the distinctiveness of a distinctive optical fiber, and in the efficient use of ink. Further, since the amount of ink is appropriate, transmission loss does not occur in the distinctive optical fiber.

In order to achieve the above object, the present invention also provides an optical fiber cable including many distinctive optical fibers comprising an optical fiber core, a colored layer coated over the optical fiber core, and a plurality of distinctive layers, which are composed of ink, disposed intermittently in the longitudinal direction of the optical fiber core in between the optical fiber core and the colored layer.

According to this configuration, since the optical fiber cable is composed of the distinctive optical fibers excellent in distinctiveness, misconnection when connecting optical fiber cables can be eliminated, and efficient connecting can be achieved.

BRIEF DESCRIPTION OF THE DRAWINGS

FIG. 1A is a schematic cross-sectional view; and FIG. 1B is a partially perspective view.

FIG. 3 is a table showing the results of Experiment 1.

FIG. 4A is a schematic cross-sectional view; and FIG. 4B is a partially perspective view.

FIG. 5 is a table showing the results of Experiment 2.

FIG. 6A is a schematic cross-sectional view; and FIG. 6B and FIG. 6C are partially perspective views.

FIG. 7 is a table showing the results of Experiment 3.

FIG. 8A is a schematic cross-sectional view; and FIG. 8B is a perspective view.

FIG. 9 is a table showing the results of Experiment 4.

FIG. 10A is a schematic cross-sectional view; and FIG. 10B is a partially perspective view.

FIG. 11 is a table showing the results of Experiment 5.

DESCRIPTION OF THE PREFERRED EMBODIMENTS

Figure 1A:
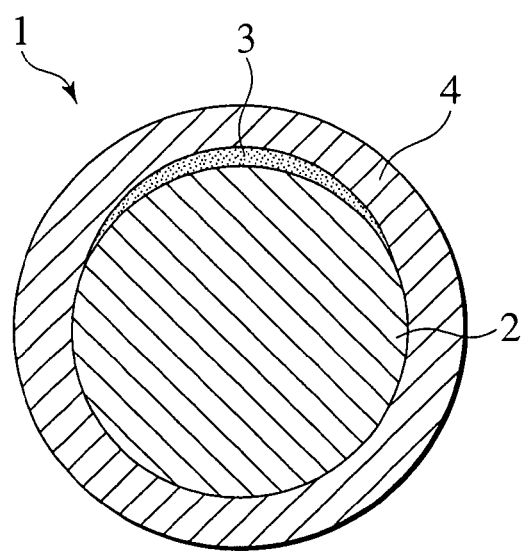
FIG. 1A and FIG. 1B are structural diagrams showing a distinctive optical fiber of the present invention.
Figure 1B:
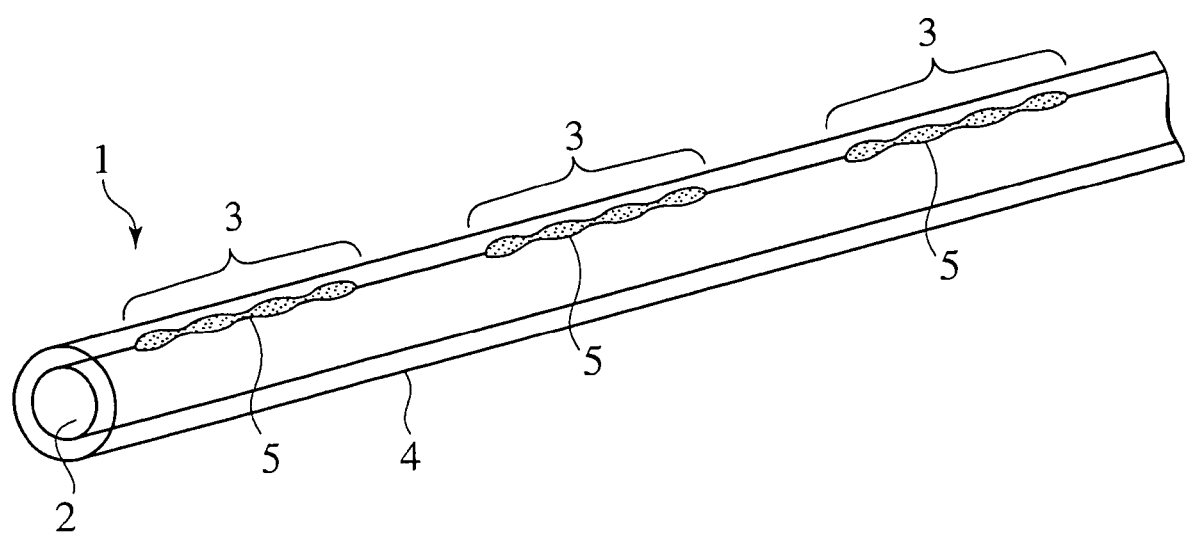

FIG. 1A is a schematic cross-sectional view of a distinctive optical fiber 1 of the present invention, and FIG. 1B is a partially perspective view of the distinctive optical fiber 1 of the present invention. The distinctive optical fiber 1 comprises an optical fiber core 2, distinctive layers 3, and a colored layer 4. A plurality of distinctive layers 3 including a plurality of fine drops 5 of ink with specific size are disposed on the optical fiber core 2 intermittently in the longitudinal direction of the optical fiber core 2. Further, the colored layer 4 is disposed on the distinctive layers 3, and on the optical fiber core 2 where the distinctive layers 3 are not disposed.

The optical fiber core 2 comprises a bare optical fiber and an ultraviolet-rays hardenable resin such as polyamide resin, coating the circumference of the bare optical fiber.

The fine drops 5 of ink used for forming the distinctive layers 3 preferably adherent well to the optical fiber core 2, are flexible and have a fast drying and curing rate. As for the ink satisfying the above requirements, an organic solvent type ink, an ultraviolet rays hardenable ink, an electron beam setting ink, and a thermosetting ink, etc. can be used. Among these inks, generally used is the organic solvent type ink, such that a pigment or a dye is dispersed in a volatile organic solvent.

The organic solvent type ink is sprayed at the appropriate times as fine drops from an ink-jet printer head onto the optical fiber core 2. By sequentially repeating such an operation at the required intervals, a plurality of distinctive layers 3 are disposed intermittently in the longitudinal direction of the optical fiber core 2. In the present embodiment, the length of the distinctive layers 3 is larger than or equal to 1 mm and smaller than or equal to 15 mm, and the interval of the distinctive layers 3 is larger than or equal to 1 mm and smaller than or equal to 200 mm. Further, the ratio of the total length of the distinctive layers 3 to the length of the distinctive optical fiber 1 is less than or equal to 20%. The thickness of the distinctive layers 3 is controlled by adjusting the distance between an ink-nozzle of an ink-jet printer and the optical fiber core 2, or by setting beforehand the size of the fine drops 5 of ink to a specific size when spraying the ink from the ink-jet printer onto the optical fiber core 2. In the present embodiment, the thickness of the distinctive layers 3 is chosen so as to be larger than or equal to 0.5 μm and smaller than or equal to 2.5 μm, and the major diameter of the fine drops 5 of ink is chosen so as to be larger than or equal to 100 μm and smaller than or equal to 400 μm. On the basis of such a process, each optical fiber composing an optical fiber cable can be made so as to be distinct from others by forming various distribution patterns of the distinctive layers 3 on the optical fiber core 2. Moreover, even if the number of the optical fibers becomes large, each optical fiber composing an optical fiber cable can be satisfactorily distinguished from others by making new distribution patterns corresponding thereto.

As regards the colored layer 4, although a conventional colored layer can be utilized, a transparent or translucent one is preferable in order to see clearly the distinctive layers 3 composed of the fine drops 5 of ink. Usually, an ultraviolet rays hardenable resin or the like is used for the colored layer 4. In the present embodiment, the thickness of the colored layer 4 is chosen so as to be larger than or equal to 2 μm and smaller than or equal to 10 μm.

Distinctiveness and transmission loss of the distinctive optical fiber 1 are dependent mainly on the thickness of the distinctive layers 3 and the thickness of the colored layer 4, the length of the distinctive layers 3 and the thickness of the colored layer 4, the length and the interval of the distinctive layers 3, the occupied ratio of the distinctive layers 3 to the optical fiber core 2, and the size of the fine drops 5 of ink. Therefore, the following five experiments were sequentially carried out in order to obtain the optimum conditions to yield the distinctive optical fiber 1 having an appropriate distinctiveness and low transmission loss and to demonstrate the propriety of the various ranges of the numerical values described above.

In Experiment 1, the thickness of distinctive layers 3 and a colored layer 4 are varied respectively, to investigate the effect upon the distinctiveness and transmission loss of a distinctive optical fiber 1 wherein the distinctive layers 3 have a constant length and a constant interval. In Experiment 2, the length of distinctive layers 3 and the thickness of a colored layer 4 are varied respectively, to investigate the effect upon the distinctiveness and transmission loss of a distinctive optical fiber 1 wherein the distinctive layers 3 have a constant thickness and interval. In Experiment 3, the length and interval of distinctive layers 3 are varied respectively, to investigate the effect upon the distinctiveness of a distinctive optical fiber 1 wherein the distinctive layers 3 have a constant thickness and a colored layer 4 also has a constant thickness. In Experiment 4, a ratio of the total length of distinctive layers 3 to the length of a distinctive optical fiber 1 (an occupied ratio) is varied, to investigate the effect upon the distinctiveness and transmission loss of the distinctive optical fiber 1 wherein the distinctive layers 3 have a constant thickness and a colored layer 4 also has a constant thickness. In Experiment 5, the major diameter of a fine drop 5 of ink is varied, to investigate the effect upon the distinctiveness of a distinctive optical fiber 1 wherein the distinctive layers 3 have a constant thickness, length and interval, and a colored layer 4 has a constant thickness.

[Experiment 1]

In a distinctive optical fiber 1, the clearness of a plurality of distinctive layers 3 varies dependent upon the thickness of a colored layer 4 and the thickness of the distinctive layers 3. Further, when an external force such as bending is applied to the distinctive optical fiber 1, there is a possibility that delamination will occur between the distinctive layers 3 and the colored layer 4 or between the distinctive layers 3 and an optical fiber core 2 and a possibility that non-uniform force will be applied to the optical fiber core 2 thus increasing transmission loss. Therefore, the thickness of the distinctive layers 3 and the thickness of the colored layer 4 are varied respectively to investigate the effect upon the distinctiveness and transmission loss of the distinctive optical fiber 1.

Figure 2:
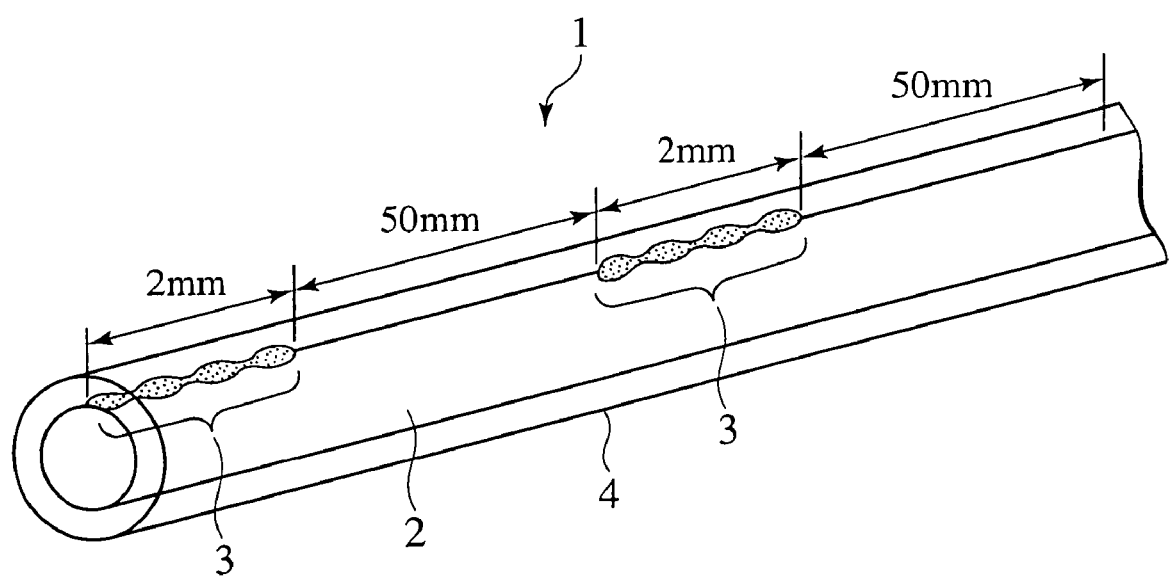
FIG. 2 is a structural diagram showing a distinctive optical fiber used in Experiment 1.

As shown in FIG. 2, a plurality of distinctive layers 3 with a length of 2 mm composed of an organic solvent type ink were disposed on a single-mode optical fiber core 2 with an outer diameter of 250 μm by means of an ink-jet printer head at an interval of 50 mm in the longitudinal direction of a distinctive optical fiber 1. Each of the distinctive layers 3 was formed by spraying approximately four drops of the organic solvent type ink. Then, the colored layer 4 of an ultraviolet rays hardenable resin was disposed at thicknesses of 5 μm, 10 μm, 11 μm respectively over a plurality of the distinctive layers 3 and over the optical fiber core 2 on which the distinctive layers 3 were not disposed. Using the distinctive optical fibers 1 thus configured a loose tube was produced with an inner diameter of 3 mm and an outer diameter of 5 mm. Using this loose tube as a test sample, the distinctiveness and variations (dB/km) of transmission loss were measured. Additionally, the distinctiveness was divided visually after taking the distinctive optical fiber 1 from out of the loose tube, which had been disassembled. The results were depicted using a sign ○ for those easily distinguished and a sign × for those which were difficult to distinguish. Further, the variation of transmission loss was shown by an increment from the transmission loss of the optical fiber before forming the colored layer 4 to the transmission loss thereof after being assembled in the loose tube. If the variation of transmission loss took a value smaller than or equal to 0.02 dB/km, the variation was within the allowable range in this experiment. The length of the sample was 1000 m and the measurement was performed using OTDR (an optical pulse testing apparatus) with a wavelength of 1.55 μm. The results of Experiment 1 are shown in FIG. 3.

From FIG. 3, it is seen that a range of the thickness of the distinctive layers 3 and the thickness of the colored layer 4 must be specified in order to obtain the distinctive optical fiber 1 which is excellent in distinctiveness and with low transmission loss. That is to say, it is understood from the results of Test 2, 3, 5, 6 that the thickness of the distinctive layers 3 must be chosen in the range larger than or equal to 0.5 μm and smaller than or equal to 2.5 μm, and the thickness of the colored layer 4 must be chosen in the range larger than or equal to 2 μm and smaller than or equal to 10 μm, preferably in the range larger than or equal to 5 μm and smaller than or equal to 10 μm. Moreover, generally speaking, since the minimum thickness of a colored layer is preferably four times larger than the minimum value of the thickness of distinctive layers, 2 μm was chosen from the results of Experiment 1. If the thickness of the colored layer 4 reaches 11 μm as shown in Test 7, for example, deviation from the above range will make the clearness of the ink vague due to the larger thickness of the colored layer 4 resulting in a problem of distinctiveness for the distinctive optical fiber 1. Further, as shown in Test 1, if the thickness of the distinctive layers is reduced to 0.4 µm, the clearness of the ink will become vague due to the smaller thickness of the ink itself, resulting in a problem of distinctiveness for the distinctive optical fiber 1 even though the thickness of the colored layer 4 is 5 µm. Also, as shown in Test 4, if the thickness of the distinctive layers 3 is increased to 2.6 µm, variations of transmission loss will take a value larger than 0.02 dB/km resulting in a problem when an optical fiber cable is assembled.

Consequently, as to the conditions for obtaining a distinctive optical fiber 1 with an appropriate distinctive function and low transmission loss, the thickness of the distinctive layers 3 must be chosen in the range larger than or equal to 0.5 µm and smaller than or equal to 2.5 µm, and the thickness of the colored layer 4 must be chosen in the range larger than or equal to 2 µm and smaller than or equal to 10 µm, preferably in the range larger than or equal to 5 µm and smaller than or equal to 10 µm.

[Experiment 2]

In a distinctive optical fiber 1, the clearness of distinctive layers 3 varies dependent upon the length of the distinctive layers 3 and the thickness of a colored layer 4. Further, since a slight bending of the distinctive optical fiber 1 is generated at the portion on which the distinctive layers 3 are coated, in an optical fiber core 2 due to non-uniform force applied in the circumferential direction to the distinctive optical fiber 1, there is a possibility that transmission loss increases dependent upon the length of the distinctive layers 3. Therefore, the length of the distinctive layers 3 and the thickness of the colored layer 4 are varied respectively to investigate the effect upon transmission loss and distinctiveness of the distinctive optical fiber 1.

Figure 4A:
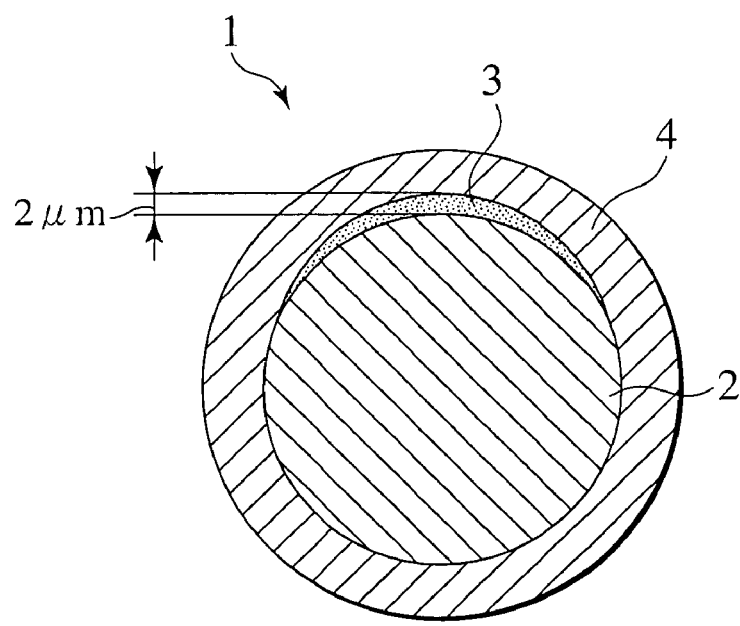
FIG. 4A and FIG. 4B are structural diagrams showing a distinctive optical fiber used in Experiment 2.
Figure 4B:
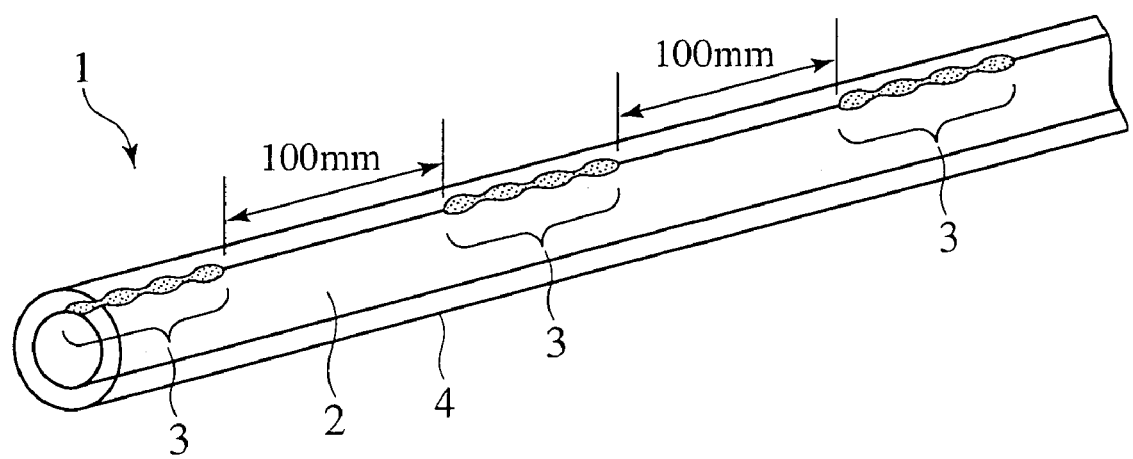

As shown in FIG. 4A and FIG. 4B, distinctive layers 3 with various lengths composed of an ultraviolet rays hardenable ink were disposed on a single-mode optical fiber core 2 with an outer diameter of 250 µm by means of controlling a spraying time of an ink-jet printer head at an interval of 100 mm in the longitudinal direction of a distinctive optical fiber 1. Here, the thickness of the distinctive layers 3 was chosen so as to be 2 µm. Then, the colored layer 4 of an ultraviolet rays hardenable resin was disposed at thicknesses of 5 µm, 10 µm, 11 µm respectively over the distinctive layers 3 and over the optical fiber core 2 on which the distinctive layers 3 were not disposed. Using the distinctive optical fibers 1 thus configured, a loose tube with an inner diameter of 3 mm and an outer diameter of 5 mm was produced. Using this loose tube as a test sample, distinctiveness and variations (dB/km) of transmission loss were measured. Additionally, distinctiveness was divided visually after taking the distinctive optical fiber 1 from out of the loose tube, which had been disassembled. The results were depicted using a sign ○ for those easily distinguished and a sign × for those which were difficult to distinguish. Further, with regard to the variation of transmission loss it was shown by an increment from the transmission loss of the optical fiber core before forming the colored layer 4 to the transmission loss thereof after being assembled in the loose tube. If the variation of transmission loss took a value smaller than and equal to 0.02 dB/km, the variation was within the allowable range in this experiment. The length of the sample was 1000 m and the measurement was performed using OTDR (an optical pulse testing apparatus) with a wavelength of 1.55 µm. The results of Experiment 2 are shown in FIG. 5.

From FIG. 5, it is seen that a range of the length of the distinctive layers 3 and the thickness of the colored layer 4 must be specified in order to obtain the distinctive optical fiber 1 which is excellent in distinctiveness and with low transmission loss. That is to say, it is understood from the results of Test 2, 3, 4, 6, 7 that the length of the distinctive layers 3 must be chosen in the range larger than or equal to 1 mm and smaller than or equal to 15 mm, and the thickness of the colored layer 4 must be chosen in the range larger than or equal to 2 µm and smaller than or equal to 10 µm, preferably in the range larger than or equal to 5 µm and smaller than or equal to 10 µm. Moreover, generally speaking, since the minimum thickness of a colored layer is preferably 4 times larger than the minimum value of the thickness of distinctive layers, 2 µm was chosen from the results of Experiment 1. If the length of the distinctive layers 3 is reduced to 0.8 mm as shown in Test 1, for example, deviation from the above range will make the clearness of the ink vague due to shorter length of the distinctive layers 3 resulting in a problem of distinctiveness for the distinctive optical fiber 1. Further, as shown in Test 5, if the length of the distinctive layers 3 reaches 20 mm, although there will be no problem of distinctiveness for the distinctive optical fiber 1, variation of transmission loss takes a value larger than 0.02 dB/km resulting in a problem when an optical fiber cable is assembled therewith. Further, as shown in Test 8, 9, if the thickness of the colored layer 4 reaches 11 µm, the clearness of the ink will become vague due to the larger thickness of the colored layer 4 resulting in a problem of distinctiveness for the distinctive optical fiber 1.

Consequently, as to the conditions for obtaining a distinctive optical fiber 1 with an appropriate distinctive function and low transmission loss, the length of the distinctive layers 3 must be chosen in the range larger than or equal to 1 mm and smaller than or equal to 15 mm, and the thickness of the colored layer 4 must be chosen in the range larger than or equal to 2 µm and smaller than or equal to 10 µm, preferably in the range larger than or equal to 5 µm and smaller than or equal to 10 µm.

[Experiment 3]

Since various distribution patterns of distinctive layers 3 are generated by means of varying the length and the interval of the distinctive layers 3, a distinctive optical fiber 1 can include a multi-distinctive function. Therefore, the length and the interval of the distinctive layers 3 are varied respectively to investigate the effect upon the distinctiveness of a distinctive optical fiber 1.

Figure 6A:
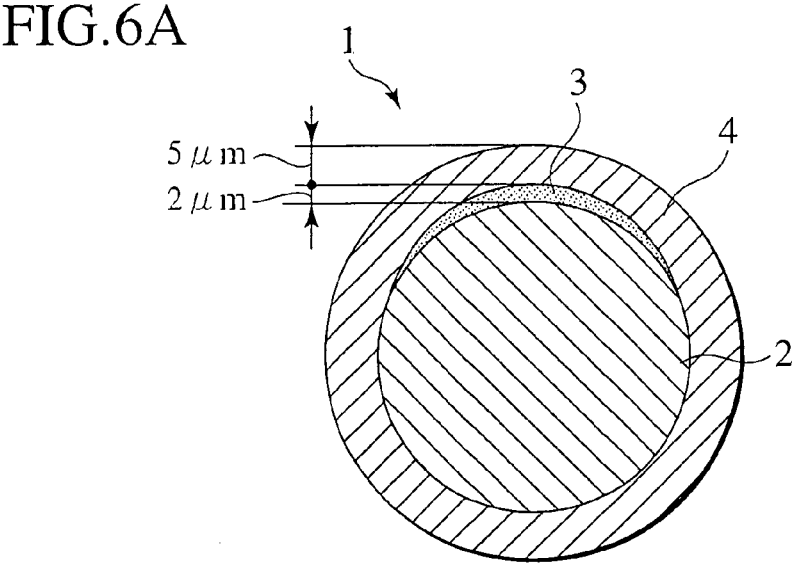
FIG. 6A, FIG. 6B and FIG. 6C are structural diagrams showing a distinctive optical fiber used in Experiment 3.
Figure 6B:
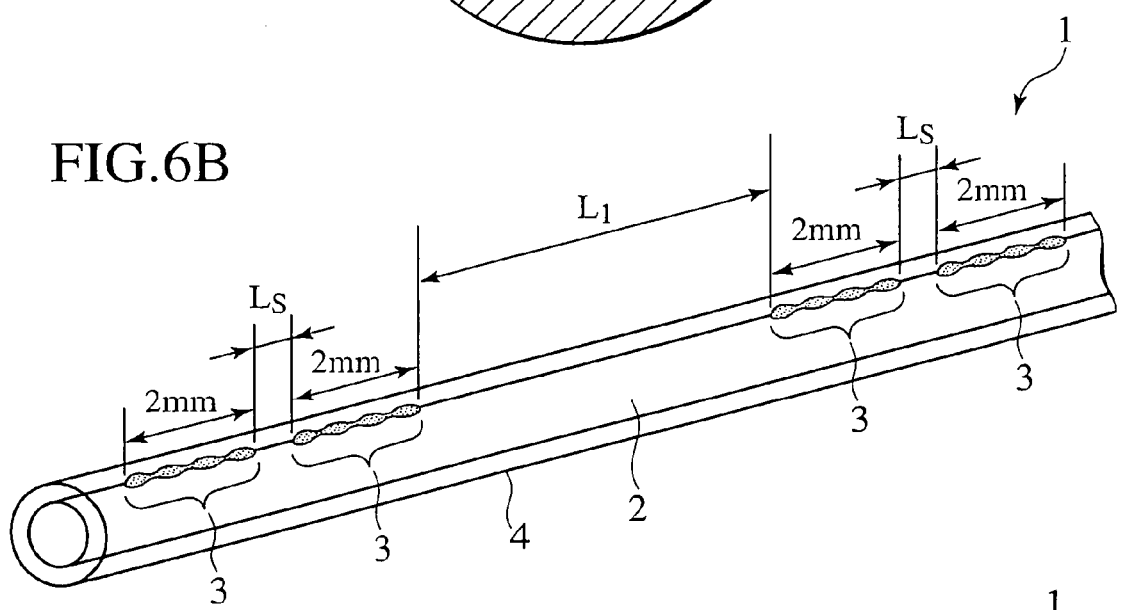
Figure 6C:
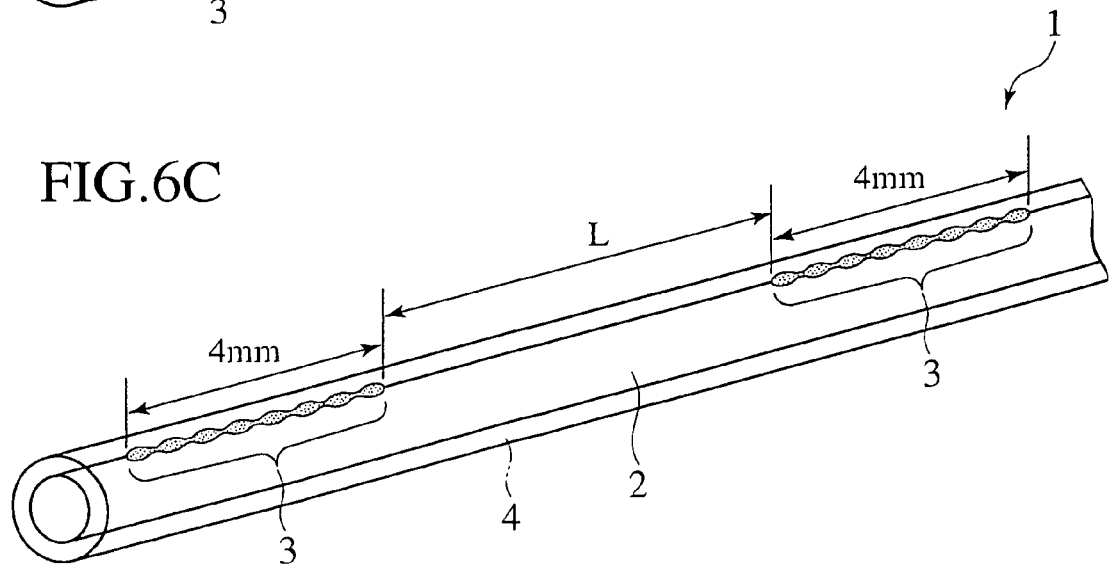

As shown in FIG. 6A and FIG. 6B, relatively short distinctive layers 3 with a length of 2 mm and with a thickness of 2 µm composed of an organic solvent type ink were disposed on a single-mode optical fiber core 2 with an outer diameter of 250 µm by means of an ink-jet printer head at the minimum interval Ls or at the maximum interval L1 in the longitudinal direction of a distinctive optical fiber 1. In the same manner, as shown in FIG. 6A and FIG. 6C, relatively long distinctive layers 3 composed of an organic solvent type ink with a length of 4 mm and with a thickness of 2 µm were disposed on a single-mode optical fiber core 2 with an outer diameter of 250 µm by means of an ink-jet printer at the interval L in the longitudinal direction of a distinctive optical fiber 1. Then, the colored layer 4 of an ultraviolet rays hardenable resin with a thickness of 5 µm was disposed over the distinctive layers 3 and over the optical fiber core 2 on which the distinctive layers 3 were not disposed. Using the distinctive optical fibers 1 thus configured, a loose tube with an inner diameter of 3 mm and an outer diameter of 5 mm was produced. Using this loose tube as a test sample, distinctiveness was measured. Additionally, this distinctiveness was divided visually after taking the distinctive optical fiber 1 from out of the loose tube, which had been disassembled. The results were depicted using a sign ○ for those easily distinguished and a sign × for those which were difficult to distinguish. The results of Experiment 3 are shown in FIG. 7.

From FIG. 7, it is seen that the range of the interval of the distinctive layers 3 must be specified in order to obtain the distinctive optical fiber 1 excellent in distinctiveness. That is to say, in the case where the length of the distinctive layers 3 is 2 mm, it is understood from the results of Test 2, 3, 4, 5 that the minimum interval Ls between ink sections with a length of 2 mm adjacent to each other must be chosen so as to be larger than or equal to 1 mm and the maximum-interval L1 also must be chosen so as to be smaller than or equal to 200 mm. If the minimum interval Ls with a length of 0.5 mm is combined with the maximum interval of L1 with a length of 50 mm as shown in Test 1, for example, deviation from this range will make the portions with a 0.5 mm interval indistinguishable from the adjacent distinctive layers 3 resulting in a problem of distinctiveness for the distinctive optical fiber 1. Further, if the minimum interval Ls with a length of 2 mm is combined with the maximum interval of L1 with a length of 300 mm as shown in Test 6, for example, the portions with the 300 mm interval will be too far apart from the adjacent distinctive layers 3, thus resulting in poor distinctiveness for the optical fiber when an optical fiber cable is assembled therewith.

Further, in the case where the length of the distinctive layers 3 is 4 mm, it is understood from the results of Test 8 to 12 that the interval L between ink sections with a length of 4 mm adjacent to each other must be chosen within a range larger than or equal to 1 mm and smaller than or equal to 200 mm. If the length of the interval L is 0.5 mm as shown in Test 7, for example, deviation from the above range will make the portions indistinguishable from the adjacent distinctive layers 3 resulting in a problem of distinctiveness for the distinctive optical fiber 1. Further, as shown in Test 13, if the length of the interval L is 300 mm, they will be too far apart from the adjacent distinctive layers 3, thus resulting in poor distinctiveness for the optical fiber, when an optical fiber cable is assembled therewith.

Consequently, as to the condition for obtaining a distinctive optical fiber 1 with an appropriate distinctive function, the interval of the distinctive layers 3 must be chosen in the range larger than or equal to 1 mm and smaller than or equal to 200 mm.

[Experiment 4]

In a distinctive optical fiber 1, the clearness of distinctive layers 3 varies dependent upon the length of the distinctive layers 3. Further, since a slight bending of the distinctive optical fiber 1 is generated at the portion on which the distinctive layers 3 composed of ink are coated, in an optical fiber core 2 due to non-uniform force applied in the circumferential direction to the distinctive optical fiber 1, transmission loss increases dependent upon the length of the distinctive layers 3. Therefore, the occupied ratio of the distinctive layers 3 on an optical fiber core 2 is varied to investigate the effect thereof upon transmission loss and distinctiveness of the distinctive optical fiber 1.

Figure 8A:
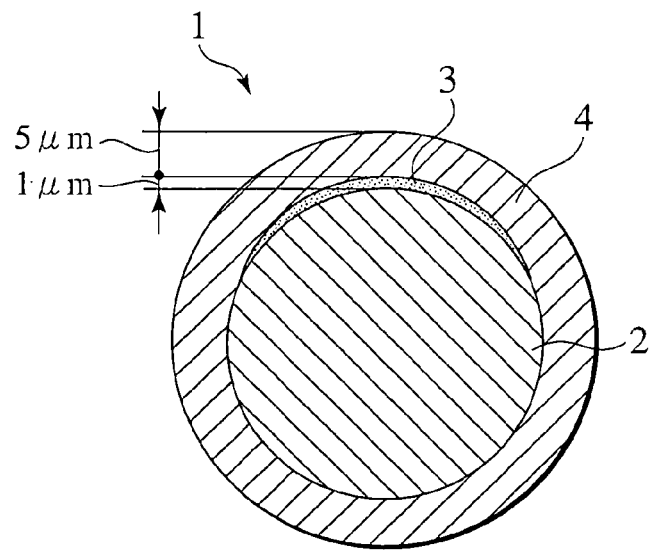
FIG. 8A and FIG. 8B are structural diagrams showing a distinctive optical fiber used in Experiment 4.
Figure 8B:
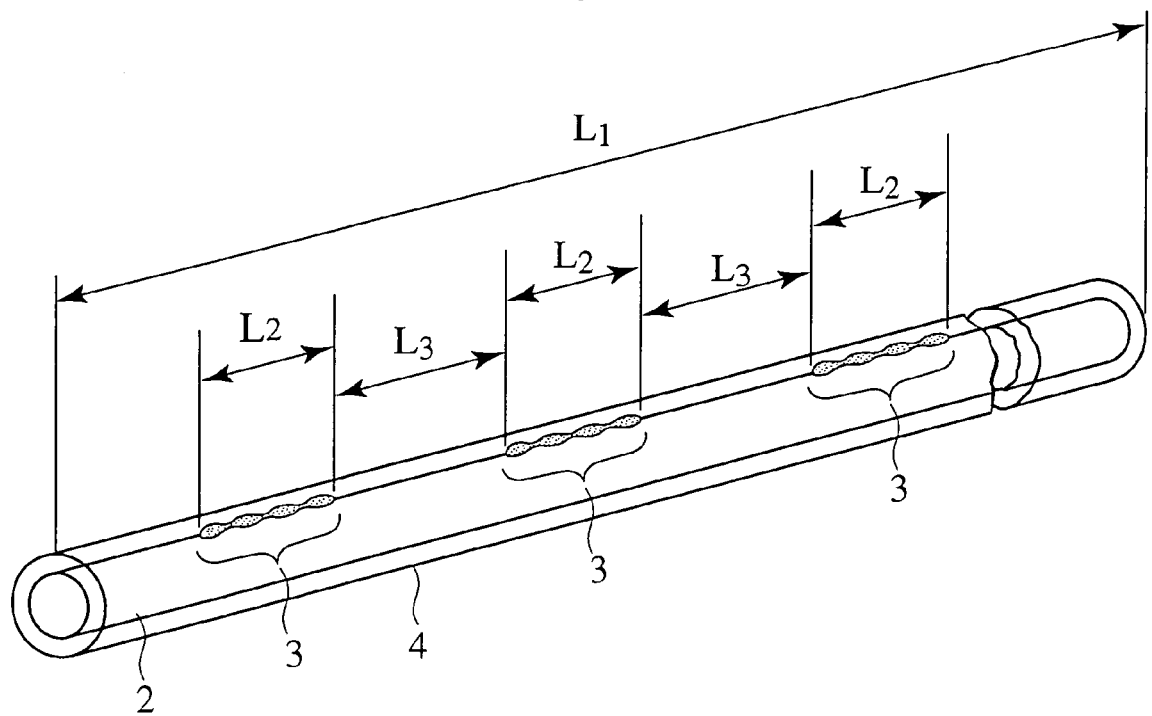

As shown in FIG. 8A and FIG. 8B, distinctive layers 3 composed of an ultraviolet rays hardenable ink were disposed on a single-mode optical fiber core 2 with an outer diameter of 250 µm by means of controlling the spraying time of an ink-jet printer head at the length L2 of the distinctive layers 3 and at the interval L3 (non-distinctive layer portion) of the distinctive layers 3 as shown in FIG. 9. Here, the thickness of the distinctive layers 3 was chosen so as to be 1 µm. Then, the colored layer 4 of an ultraviolet rays hardenable resin was disposed at a thickness of 5 µm over the distinctive layers 3 and over the non-distinctive layers portions. Using the distinctive optical fibers 1 with the length of L1 thus configured, a loose tube with an inner diameter of 3 mm and an outer diameter of 5 mm was produced. Using this loose tube as a test sample, distinctiveness and variations (dB/km) of transmission loss were measured. Additionally, the distinctiveness was divided visually after taking the distinctive optical fiber 1 from out of the loose tube, which had been disassembled. The results were depicted using a sign ○ for those easily distinguished and a sign × for those which were difficult to distinguish. Further, the variation of transmission loss was shown by an increment from the transmission loss of the optical fiber before forming the colored layer 4 to the transmission loss thereof after being assembled into the loose tube. If the variation of transmission loss took a value smaller than and equal to 0.02 dB/km, the variation was within the allowable range in this experiment. The length of the sample was 1000 m and the measurement was performed using OTDR (an optical pulse testing apparatus) with a wavelength of 1.55 µm. The results of Experiment 4 are shown in FIG. 9.

From FIG. 9, it is seen that a range of the ratio (the occupied ratio) of the total length of the distinctive layers 3 to the length L1 of the distinctive optical fiber 1 in the longitudinal direction of the distinctive optical fiber 1 must be specified in order to obtain the distinctive optical fiber 1 excellent in distinctive power and with low transmission loss. That is to say, it is understood from the results of Test 1, 2, 3, 5, 6, 7 that the occupied ratio of the distinctive layers 3 must be chosen so as to be less than or equal to 20%. If the occupied ratio reaches 30% deviating from the above range as shown in Test 4, 8, for example, although there will be no problem in distinctiveness, variation of transmission loss becomes larger than 0.20 dB/km resulting in a problem when an optical fiber cable is assembled therewith.

Consequently, as to the conditions for obtaining a distinctive optical fiber 1 with an appropriate distinctive function and low transmission loss, the occupied ratio of the distinctive layers 3 must be chosen so as to be less than or equal to 20%.

Besides, with regard to calculation of an occupied ratio, in the case where the distinctive layers 3 with the same length are sequentially disposed in a distinctive optical fiber 1, noting only one distinctive layer 3, the occupied ratio can be obtained by calculating L2/(L2+L3)×100 using the length L2 of one distinctive layer and the interval L3 between the adjacent distinctive layers 3.

[Experiment 5]

In a distinctive optical fiber 1, the clearness of the distinctive layers 3 composed of ink and consumed quantity of ink vary, dependent upon the size of a fine drop 5 of ink. The fine drops 5 of ink themselves are in the shape of a sphere, however, the fine drops 5 of ink are disposed as elliptical adhered bodies of the distinctive layers 3 along the longitudinal direction of an optical fiber core 2 when adhering onto the optical fiber core 2 by being sprayed. This tells us that the size of the fine drop 5 of ink is approximately determined by specifying a major diameter thereof. Therefore, the major diameter of the fine drop 5 of ink is varied to investigate the distinctiveness of the distinctive optical fiber 1, and the appropriate quantity of ink.

Figure 10A:
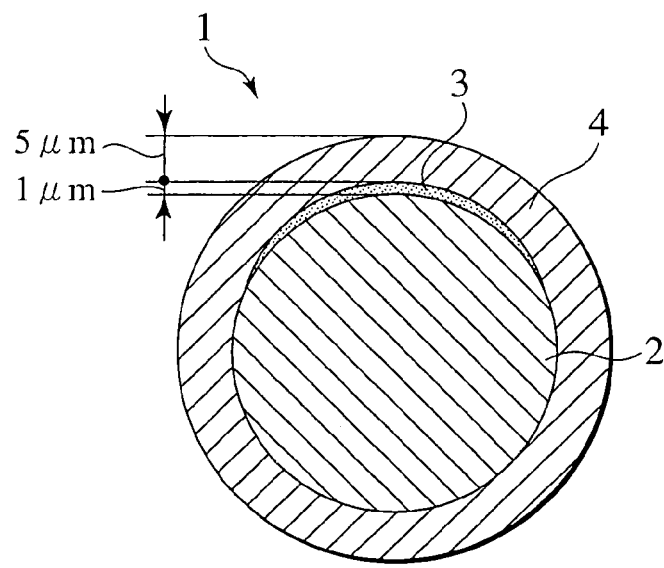
FIG. 10A and FIG. 10B are structural diagrams showing a distinctive optical fiber used in Experiment 5.
Figure 10B:
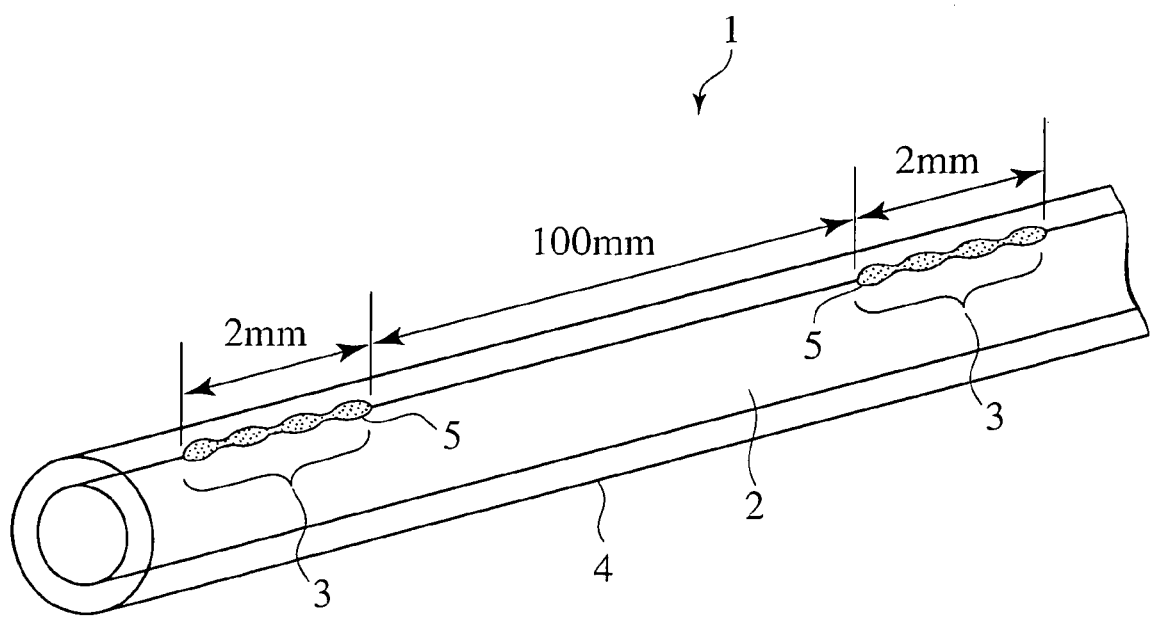

As shown in FIG. 10A and FIG. 10B, distinctive layers 3 were disposed on a single-mode optical fiber core 2 with an outer diameter of 250 μm by means of spraying fine drops 5 of an ultraviolet rays hardenable ink having various major diameters with an ink-jet printer at an interval of 100 mm. Here, the length and the thickness of the distinctive layers 3 were chosen so as to be 2 mm and 1 μm respectively. Then, the colored layer 4 of an ultraviolet rays hardenable resin was disposed at a thickness of 5 μm over the distinctive layers 3 and over the optical fiber core 2 on which the distinctive layers 3 were not disposed. For the distinctive optical fiber 1 thus configured, distinctiveness was visually measured. The results were depicted using a sign ○ for those easily distinguished and a sign × for those which were difficult to distinguish. Additionally, for each major diameter of the fine drops 5 of ink, the length of a distinctive optical fiber 1 including the distinctive layers 3 manufactured using the same amount (100 g) of ink (the manufactured length of an optical fiber) corresponding to each major diameter of the fine drops 5 of ink was described as a relative value of the manufactured length to the manufactured length, which was set at 100, using a fine drop 5 of ink with a major diameter of 100 μm. The results of Experiment 5 are shown in FIG. 11.

From FIG. 11, it is seen that the range of the major diameter of the fine drop 5 of ink must be specified in order to obtain the distinctive optical fiber 1 excellent in distinctiveness and with low costs. That is to say, it is understood from the results of Test 2 to 7 that the major diameter of the fine drop 5 of ink must be chosen so as to be larger than or equal to 100 μm and smaller than or equal to 600 μm. If the major diameter reaches 80 μm deviating from the above range as shown in Test 1, for example, the distinctive layers occupy only narrow portions on the circumference of an optical fiber core and appear merely as fine lines, resulting in a slight problem of distinctiveness. Further, considering, in combination with the above, the consumed quantity of ink which is described as the manufactured length of an optical fiber, it is preferable to use the fine drop 5 of ink in which the manufactured length reaches 80 to 100 μm in view of manufacturing costs.

Consequently, as to the conditions for obtaining a distinctive optical fiber with an appropriate distinctive function, the major diameter of the fine drop 5 of ink must be chosen so as to be larger than or equal to 100 μm and smaller than or equal to 400 μm.

[Optical Fiber Cable using Distinctive Optical Fibers]

An optical fiber cable can be formed using many distinctive optical fibers 1, which satisfy each of the conditions obtained from Experiment 1 to 5.

The distinctive optical fibers 1 can be applied to various types of optical fiber cables referred to as a strand-type, a tube-type, and a slot-type. For example, with regard to the tube-type optical fiber cable, after receiving a plurality of the distinctive optical fibers 1 in a forming pipe, the forming pipe is covered by a plastic body wherein a tension member, and a rip cord, etc. are disposed. The number of distinctive optical fibers used therein is from 4 to 64 or the like.

The required optical fiber can be selected without fail using the distinctive optical fibers 1 with a multi-distinctive function during terminal treatment of the optical fiber cable. Therefore, there will be no misconnections and a large improvement in operational efficiency can be expected. Further, the distinctive optical fiber 1 can also be used for a combined body, referred to as an optical fiber unit, having a structure in which many optical fibers are assembled and covered with one or more coating layers, and the same effect as that in the optical fiber cables can be obtained.

What is claimed is:

1. A distinctive optical fiber comprising:
   an optical fiber core;
   a colored layer coated over the optical fiber core; and
   a plurality of distinctive layers, disposed intermittently in a longitudinal direction of the optical fiber core between the optical fiber core and the colored layer, each distinctive layer comprising fine drops of ink and taking a substantial linear shape, wherein a ratio of a total length of the distinctive layers to a length of the distinctive optical fiber is less than or equal to 1:5.

2. The distinctive optical fiber described in claim 1, wherein a thickness of the distinctive layers is from 0.5 μm to 2.5 μm, and a thickness of the colored layer is from 2 μm and to 10 μm.

3. The distinctive optical fiber described in claim 1, wherein a length of the distinctive layers is from 1 mm to 15 mm.

4. The distinctive optical fiber described in claim 1, wherein an interval between the distinctive layers is from 1 mm to 200 mm.

5. The distinctive optical fiber described in claim 1, wherein the fine drops have a major diameter from 100 μm to 400 μm.

6. An optical fiber cable comprising:
   a plurality of optical fibers disposed in a conduit, at least one of the optical fibers comprising:
   an optical fiber core;
   a colored layer disposed to cover the optical fiber core; and
   a plurality of distinctive layers disposed intermittently in a longitudinal direction of the optical fiber core between the optical fiber core and the colored layer, each distinctive layer comprising fine drops of ink and taking a substantial linear shape, wherein a ratio of a total length of the distinctive layers to a length of the distinctive optical fiber is less than or equal to 1:5.

* * * * *